United States Patent
Hauswiesner et al.

(10) Patent No.: US 11,961,200 B2
(45) Date of Patent: Apr. 16, 2024

(54) METHOD AND COMPUTER PROGRAM PRODUCT FOR PRODUCING 3 DIMENSIONAL MODEL DATA OF A GARMENT

(71) Applicant: Ractive Reality GmbH, Graz (AT)

(72) Inventors: Stefan Hauswiesner, Puch bei Weiz (AT); Philipp Grasmug, Graz (AT)

(73) Assignee: Reactive Reality GmbH, Graz (AT)

( * ) Notice: Subject to any disclaimer, the term of this patent is extended or adjusted under 35 U.S.C. 154(b) by 92 days.

(21) Appl. No.: 17/631,223

(22) PCT Filed: Jul. 28, 2020

(86) PCT No.: PCT/EP2020/071280
§ 371 (c)(1),
(2) Date: Jan. 28, 2022

(87) PCT Pub. No.: WO2021/018894
PCT Pub. Date: Feb. 4, 2021

(65) Prior Publication Data
US 2022/0189095 A1 Jun. 16, 2022

(30) Foreign Application Priority Data
Jul. 30, 2019 (EP) .................................... 19189134

(51) Int. Cl.
*G06T 19/20* (2011.01)
*G06T 7/11* (2017.01)
(Continued)

(52) U.S. Cl.
CPC ................ *G06T 19/20* (2013.01); *G06T 7/11* (2017.01); *G06T 15/04* (2013.01); *G06T 15/50* (2013.01);
(Continued)

(58) Field of Classification Search
CPC . G06T 19/20; G06T 7/11; G06T 15/04; G06T 15/50; G06T 17/00; G06T 2210/16;
(Continued)

(56) References Cited

U.S. PATENT DOCUMENTS 6,968,297 B1 * 11/2005 Ziakovic ................ A41H 3/007
703/1
10,789,774 B2 * 9/2020 Oh ......................... G06T 17/205
(Continued)

FOREIGN PATENT DOCUMENTS

CN 109712223 A 5/2019
IN 202227003080 6/2022
(Continued)

OTHER PUBLICATIONS

Brouet, R. et al.: "Design preserving garment transfer" ACM Transactions on Graphics; Jul. 2012, Association for Computing Machinery USA, vol. 31, No. 4, Article 36.
(Continued)

*Primary Examiner* — Jitesh Patel
(74) *Attorney, Agent, or Firm* — Eschweiler & Potashnik, LLC (57) ABSTRACT

In a method for producing three-dimensional model data of a garment having a target garment size, intermediate model data of the garment are stored, which are associated with a base garment size and include intermediate geometry data and at least one intermediate texture map associated with the intermediate geometry data. Through semantic segmentation of the intermediate texture map a label map is generated that associates each element of the intermediate texture map to a respective one of a set of segments of the garment and associated resizing rules. Geometry data for the model data are generated by resizing the intermediate geometry data based on the label map, on the resizing rules, on a body
(Continued)

model and on a set of scaling factors between the base garment size and the target garment size. A texture map is generated based on the intermediate texture map, on the label map, on the resizing rules and on the set of scaling factors.

14 Claims, 7 Drawing Sheets

(51) Int. Cl.
*G06T 15/04* (2011.01)
*G06T 15/50* (2011.01)
*G06T 17/00* (2006.01)
*G06V 10/26* (2022.01)
*G06V 20/64* (2022.01)

(52) U.S. Cl.
CPC .............. *G06T 17/00* (2013.01); *G06V 10/26* (2022.01); *G06V 20/64* (2022.01); *G06T 2210/16* (2013.01); *G06T 2210/62* (2013.01); *G06T 2219/2004* (2013.01); *G06T 2219/2016* (2013.01)

(58) Field of Classification Search
CPC ......... G06T 2210/62; G06T 2219/2004; G06T 2219/2016; G06T 15/503; G06T 15/506; G06V 10/26; G06V 20/64
See application file for complete search history.

(56) References Cited

U.S. PATENT DOCUMENTS

| | | | | |
|---|---|---|---|---|
| 11,164,381 | B2* | 11/2021 | O'Brien | G06F 30/20 |
| 2015/0134302 | A1* | 5/2015 | Chhugani | G06T 17/10 |
| | | | | 703/1 |
| 2015/0287242 | A1 | 10/2015 | Kim et al. | |
| 2016/0092956 | A1* | 3/2016 | Su | G06Q 30/0643 |
| | | | | 705/26.5 |
| 2016/0155262 | A1* | 6/2016 | Chen | G06T 7/50 |
| | | | | 345/426 |
| 2016/0335807 | A1* | 11/2016 | Lee | G06Q 30/0643 |
| 2016/0379419 | A1* | 12/2016 | Khalili | G06T 19/20 |
| | | | | 345/419 |
| 2017/0046769 | A1* | 2/2017 | Jackson | G06Q 30/0643 |
| 2017/0161948 | A1* | 6/2017 | Hua | A41H 1/02 |
| 2018/0197331 | A1 | 7/2018 | Chen et al. | |
| 2019/0008226 | A1* | 1/2019 | Krivonosova | A41H 3/04 |
| 2019/0043269 | A1* | 2/2019 | Lin | G06T 7/62 |

FOREIGN PATENT DOCUMENTS

| | | |
|---|---|---|
| JP | H11296573 A | 10/1999 |
| JP | 2000331058 A | 11/2000 |
| WO | 2018151612 A1 | 8/2018 |

OTHER PUBLICATIONS

Chuang, Y.-Y. et al.: "A Bayesian Approach to Digital Matting" Proceedings of the 2001 IEEE Computer Society Conference on Computer Vision and Pattern Recognition, Jan. 1, 2001, vol. 2, pp. 264-271.

Hilsmann, A. et al.: "Tracking and Retexturing Cloth for Real-Time Virtual Clothing Applications" Financial Cryptography and Data Security; May 4, 2009; Springer-Verlag Berlin Heidelberg, pp. 94-105.

Holte, M. B.: "3D Scanning of Clothing Using a RGB-D Sensor with Application in a Virtual Dressing Room" Advances in Applied Digital Human Modeling and Simulation, Advances in Intelligent Systems and Computing, Jul. 27, 2016, vol. 481, pp. 143-153.

Laffont, P.-Y. et al.: "Coherent intrinsic images from photo collections" ACM Transactions on Graphics, vol. 31, No. 6, Nov. 1, 2012, p. 1.

Li, L. et al.: "A data-driven editing framework for automatic 3D garment modeling" Multimedia Tools and Applications, Kluwer Academic Publishers, Boston, US, Jun. 22, 2016, vol. 76, No. 10, pp. 12597-12626.

Mitsunaga, T. et al.: "Key Extraction by Image Differentiation" Proceedings of the International Conference on Image Processing, Oct. 23, 1995, vol. 2, pp. 248-251.

Norimichi, U. et al.: "Reference consistent reconstruction of 3D cloth surface" Computer Vision and Image Understanding, Academic Press US, Apr. 8, 2012, vol. 116, No. 8, pp. 869-881.

Scholz, V. et al.: "Texture replacement of garments in monocular video sequences" Eurographics Symposium on Rendering, Nicosia, Cyprus, Jun. 26-28, 2006, pp. 305-312.

Xu, Y. et al.: "Virtual Garment Using Joint Landmark Prediction and Part Segmentation" 2019 IEEE Conference on Virtual Reality and 3D User Interfaces, Mar. 23, 2019, pp. 1247-1248.

Yuan, B. et al.: "A New Approach to Automatic Clothing Matting from Mannequins" 2019 IEEE International Conference on Multimedia and Expo (ICME), pp. 880-885.

Zhang, D. et al.: "An integrated method of 3D garment design" The Journal of the Textile Institute, Taylor & Francis Group, Feb. 8, 2018, vol. 109, No. 12, pp. 1595-1605.

European Search Report dated Apr. 9, 2020 for European Application No. 19189134.0.

International Search Report dated Dec. 12, 2020 for International Application No. PCT/EP2020/071280.

* cited by examiner

|  | 35 / 36 (XS) | 37/38 (S) | 39/40 (M) | 41/42 (L) | 43/44 (XL) | 45/56 (XXL) |
|---|---|---|---|---|---|---|
| 1 Chest circ. | 93.5 cm | 101.0 cm | 109.5 cm | 117.0 cm | 125.0 cm | 133.0 cm |
| 2 Waist circumference | 85.5 cm | 93.0 cm | 101.0 cm | 109.5 cm | 117.5 cm | 125.5 cm |
| 3 Hip circumference | 91.5 cm | 99.0 cm | 107.5 cm | 115.0 cm | 123.5 cm | 131.0 cm |
| 4 Biceps circ. | 36.5 cm | 38.0 cm | 41.5 cm | 43.5 cm | 46.5 cm | 48.5 cm |
| 5 Back width | 41.5 cm | 43.0 cm | 45.0 cm | 47.5 cm | 49.0 cm | 51.0 cm |
| 6 Back length | 73.5 cm | 75.0 cm | 76.5 cm | 78.0 cm | 79.5 cm | 81.0 cm |
| 7 Sleeve length | 64.5 cm | 65.0 cm | 67.0 cm | 68.5 cm | 69.5 cm | 70.0 cm |

METHOD AND COMPUTER PROGRAM PRODUCT FOR PRODUCING 3 DIMENSIONAL MODEL DATA OF A GARMENT

REFERENCE TO RELATED APPLICATIONS

This application is a National Phase entry application of International Patent Application No. PCT/EP2020/071280 filed Jul. 28, 2020, which claims priority to EP 19189134.0 filed on Jul. 30, 2019, the contents of which are herein incorporated by reference in its entirety.

The present disclosure relates to a computer implemented method and a computer program product for producing 3-dimensional, 3D, model data of a garment.

Creating 3D models of garments for visualization and fit simulation can be done in different ways like manual modeling or converting CAD models of the garment. Online retailers usually have a very high number of items and the product range changes frequently. Therefore, manual modeling is not a reasonable approach. CAD models, usually used to design and manufacture the garments, can be converted into 3D models using specialized software. The resulting models, however, are not suitable for real-time visualization or simulation due to the usually very high detail level, e.g. geometric primitive count, and poor topological quality, e.g. disconnected parts. Furthermore, the CAD model does often not fully correspond to the final product due to the production process. In production, certain modifications have to be made and attributes of the fabrics influence the appearance and shape of the result. These changes are not reflected by the original CAD model.

Furthermore, in conventional solutions, only one size of a 3D model of a garment is generated at a time. If 3D models of different sizes are required, all of them have to be generated separately. Retailers want to avoid this overhead.

An object to be achieved is to provide an improved modelling concept that allows the production of 3-dimensional model data of a garment of variable size.

This object is achieved with the subject-matter of the independent claims. Embodiments and developments derive from the dependent claims.

The improved modelling concept is based on the insight that garments do not scale uniformly. This means that when, for example, going from size medium to size large, the scale factors of different parts of the garments are different. For example, the scale factor for the length of the sleeves of a garment is different from the scale factor for the circumference of the sleeve. For production purposes the way a garment scales is described by a grading table. This table describes how different parts scale from one size to the next. According to the improved modelling concept, this information is used to adjust inter alia the geometry of the model for one or more desired sizes.

To this end, different sizes of model data are algorithmically generated from a single 3D model of the garment and the garment's grading tables. This, for example, includes performing a semantic segmentation of intermediate model data of the garment in order to determine various segments of the garment. This information is then used for separately scaling geometry data of the garment, e.g. a mesh or the like, and an associated texture map that carries information about the visible texture of the garment. In this process, a body model associated with the garment is also employed, providing information e.g. about which part of the geometry and/or the texture map corresponds to which part of the body in a worn state of the garment.

For example, the texture of the garment, e.g. representing the cloth, fabric and prints, is also not scaled uniformly but rather usually repeated. Therefore, knowledge of the used fabric can be used to simulate this behavior. Elements like buttons or pockets also usually do not scale, or scale only under certain constraints, like seams or zippers scale only in one direction. Prints on a garment usually also scale independently from the pattern of the fabric. The underlying logic usually cannot be described by a set of global rules. To a certain degree, the grading of a garment is up to the creative freedom of the designer and manufacturing requirements. Therefore, the improved modelling concept provides a way to modify the scaling behavior for each element or segment independently to reflect these design choices.

The intermediate model data may be provided externally, for example generated with a conventional method. However, according to the improved modelling concept, the intermediate model data may be generated based on a set of images showing the garment from a plurality of viewing angles using three-dimensional reconstruction. The images may be photographs of the garment being dressed on a mannequin or on a person or be rendered images of a CAD model of the garment in a worn state.

According to an embodiment of the improved modelling concept, a method which, for example, is computer-implemented, for producing three-dimensional model data of a garment having a target garment size comprises storing, e.g. in a computer system, intermediate model data of the garment, the intermediate model data being associated with a base garment size and comprising intermediate geometry data and at least one intermediate texture map having a plurality of elements associated with the intermediate geometry data. For example, the intermediate geometry data comprises a list of 3D points that may be surface points and that determine a 3D geometry of the garment. In some implementations, the 3D points may define a mesh structure while other implementations describing a 3D surface are not excluded. The intermediate texture map may be in the form of a two-dimensional texture comprising the plurality of elements. For example, the elements may represent texels. Each element may be defined by a coordinate pair, e.g. UV coordinates, associated with one of the 3D points of the intermediate geometry data:

According to the method, a semantic segmentation of the intermediate texture map is performed, for example in the computer system, for generating a label map. The label map associates each element of the intermediate texture map to a respective one of a set of segments of the garment. Each segment has an associated resizing rule. Furthermore, geometry data for the model data of the garment are generated, for example in the computer system, by resizing the intermediate geometry data based on the label map, on the resizing rules associated with the segments, on a body model associated to the garment and on a set of a plurality of scaling factors between the base garment size and the target garment size. Each of the scaling factors is associated with a respective portion of the body model. For example, the set of scaling factors comprises two or more scaling factors, e.g. corresponding to a number of portions of the body model.

Furthermore, a texture map for the model data of the garment is generated, for example in the computer system, based on the intermediate texture map, on the label map, on the resizing rules associated with the segments and on a set of scaling factors.

In some implementations, the semantic segmentation of the intermediate texture map is performed further based on the association of the plurality of elements of the intermediate texture map with the intermediate geometry data.

The model data produced by the method have the same or at least a similar format as the intermediate model data, that is, a set of 3D points comprised by the geometry data and respective texture elements that are, for example, organized in a 2D structure, wherein each element is associated with at least one of the 3D points, e.g. by respective UV coordinates.

For example, the semantic segmentation is performed using a machine learning algorithm. For example, the label map generated by this process describes which elements of the intermediate texture map belong to which semantic region of a garment or a likelihood of such an assignment. For example, the process assigns a semantic meaning to each element, e.g. texel, such as belonging to a collar, a seam, a button etc. of the garment. In some implementations, the same algorithm may label background texels and/or mannequin texels for removal, which may be part of the intermediate texture map, e.g. as a result of a previous production of the intermediate model data. For example, the label map assigns a behavioral rule to each element of the intermediate texture map, in particular by assigning each element to a specific segment of the garment. The label map may have the same format as the intermediate texture map, hence the respective semantic meaning of each element can be easily transferred to the intermediate geometry data, e.g. the 3D surface or the 3D points through the respective UV coordinates in the texture map.

For example, the body model further includes information defining an association between the respective portions of the body model and respective portions of the intermediate geometry data. Generating the geometry data may comprise resizing of the intermediate geometry data by scaling or repeating the respective portions of the intermediate geometry data as defined by the body model based on the resizing rules.

Scaling a garment's geometry data and texture map based on the scaling factors may be technically correct, but does not reflect what happens during production of garments for every type of garment. For example, elements like buttons and pockets usually do not scale, and elements like zippers or seams scale only in certain directions. Furthermore, in reality, fabrics are usually not scaled by stretching, but rather more of the fabric is used. This technically corresponds to repeating the material. Accordingly, the resizing rules define how the different segments of the garment scale when generating the model data of the garment. For example, the resizing rules may determine whether specific segments of the garment are resized according to one of the following: scaling, in particular in every direction, repeating, in particular by repeating geometrical structures and/or the texture; repeating with constraints, wherein the repeating is performed only in e.g. one direction and scaling is prevented or limited in another direction; or keeping the size unchanged, e.g. for unsizeable elements such as buttons or the like.

In some implementations, generating the texture map comprises resizing of the intermediate texture map by scaling or repeating or cutting pattern of the intermediate texture map based on the resizing rules. Hence, the appropriate method for generating the texture for each segment can be selected individually.

In some implementations generating the texture map comprises separating lighting information of the intermediate texture map from color information of the intermediate texture map for producing a lighting map and a color map. The color map is then resized and the lighting map is applied to the resized color map for producing a texture map. With such a separation approach, the texture map can be resized without incorrectly handling lighting and/or shading effects caused by, e.g. wrinkles, concavities, convexities in the geometry, etc. Hence, a more realistic texture of the texture map in the target garment size can be achieved.

The process can further be supported by providing information about the texture separately. For example, the separating is based on images of fabric patches or material patches associated with the intermediate model data. For example, the fabric patches and/or material patches may be captured under white, diffuse and homogenous lighting conditions, which allows to compute the difference between the texture of the texture map, which includes the shading information, and the uniformly lit fabric sample or material sample.

In some implementations, also alpha matting of the texture can be employed. For example, the method further comprises generating a transparency map based on the intermediate texture map and, optionally, the label map, wherein generating the transparency map includes determining, for each element of the intermediate texture map, a background color based on the intermediate texture map, comparing each element of the intermediate texture map to the respective background color of the element for determining a transparency value of the element, and for each element of the intermediate texture map, subtracting, based on the respective transparency value of the element, the background color of the element from a respective foreground color of the element. The transparency map may be brought to the same size as the texture map of the target garment size, e.g. by the same algorithms. Hence, the transparency map has the same associations to the geometry data as the texture map. The transparency map allows the realistic effect of rendering complex garments to be increased, in particular with transparent or complex outlines like fringes, laces, etc.

In various implementations of the method, the body model is stored with and corresponds to the intermediate model data or is generated by aligning and/or mapping a standard body model to the intermediate geometry data.

If the body model is stored with the intermediate model data, for example 3D points of the intermediate geometry data can be assigned to a rig of an underlying mannequin defined by the body model. The process of such an assignment can be called "skinning" or "rigging". For example, a skinning process assigns the 3D points, which can also be called "vertices", to respective bones of the rig with a specific weight. This assignment can be used to scale or repeat the respective part of the intermediate geometry data when applying the information of the respective scaling factors to the skeleton or bones as defined by the body model. In such an implementation the body model may be a rigged mannequin model. The body model may also contain fit information exported from a CAD model corresponding to a mannequin, a rig etc., which may have been used during production of the intermediate model data.

If the body model is not stored with the intermediate model data, skeleton and rig information may be computed automatically for generating the body model. For example, automated methods for computing the skeleton and rig of a model work best with human-shaped models. For some types of garments, it is difficult for the humanoid shape to be recognized by the machine learning method of a corresponding rigging algorithm, for example skirts or tube tops or the like. According to some implementations, a standard body model is used as an input together with the intermediate model data, which allows for a robust automated rigging. For example, a humanoid shape is given as a consequence of the standard body model, and the relative location of the garment on the mannequin describes its overall fit. The resizing rules may define a mapping between the scaling factors and the modifications of the skeleton after resizing.

For example, modifications are done starting with coarse modifications and ending with fine modifications. For example for a shirt, first the desired shoulder width is established by scaling globally. Then the height is scaled to achieve the correct torso length. Afterwards the depth is scaled to achieve the correct waist circumference followed by scaling the arms using the rig. Similar resizing rules can be found for respective other types of garments.

In the previous embodiments it had been assumed that the intermediate model data are already available as a starting point for producing the so called final three-dimensional model data of the garment. However, in some implementations of the method, the intermediate model data are generated and stored based on a set of images showing the garment from a plurality of viewing angles. To this end, generating the intermediate model data includes 3D reconstruction for generating the intermediate geometry data and texture mapping for generating the intermediate texture map. The images can be one of photographs of the garment being dressed on a mannequin or on a person or rendered images of a CAD model of the garment in a worn state.

The photographs can, for example, be captured through product photography of the garment dressed on a mannequin, e.g. on a turntable, such that a 360° covering set of photographs is available. Furthermore, not only photographs in a horizontal or basically horizontal orientation may be taken, but also from different viewing angles with respect to the horizontal plane, i.e. positive and negative viewing angles, depending on the kind of garment. Freely spoken, the set of images should show the garment from all sides to have a good basis for 3D reconstruction and texture mapping.

A similar approach can be taken when the images are rendered images of a CAD model of the garment. In both cases the product, i.e. the garment, is turned in front of a real or virtual camera, or vice versa, and moved at different elevations to capture as many viewing angles as possible.

In some implementations, generating the intermediate model data is further based on a further set of images showing the garment from a plurality of viewing angles, wherein the images of the further set of images show the garment with added visually distinctive features, for example virtual or real patterns and/or stickers and/or tapes, at a surface of the garment.

For example, 3D reconstruction usually assumes textured surfaces, not smooth surfaces, to identify image features across several images. Single-colored, smooth, large surfaces may not provide ideal results. Hence, for the further set of images, respective surfaces are modified by adding the visually distinctive features, which allows a more reliable 3D reconstruction. For generating the intermediate geometry data, the 3D models resulting from the original set of images and from the further set of images are aligned, e.g. through an iterative closest point algorithm. Then, the 3D geometry data from the further set of images is texture mapped with the original image set, which may have been brought into the same coordinate system through mesh alignment or a similar procedure. As a result, the best of both image sets is used, namely a good geometry from the modified further set of images, and the original garment appearance from the unmodified set.

In some implementations of the method, wherein the images are photographs, generating the intermediate model data is further based on depth information of a surface of the garment, for example recorded with one or more active or passive depth sensors. Such depth sensors may include structured light sensors or time-of-flight sensors, LIDAR etc.

3D reconstruction and texture mapping may use standard photogrammetry methods. In some implementations, where the images are rendered images, for facilitating the 3D reconstruction process, rendering the rendered images includes at least one of:
- rendering only the front-most depth layer of the CAD model;
- modifying materials of the garment partially or completely to be opaque;
- rendering without considering any transparencies of the garment;
- rendering with neglecting transparencies of the garment partially or completely;
- using virtual lighting that is diffuse, uniform and bright;
- replacing anisotropic and shiny materials with diffuse materials of the garment;
- rendering material properties of the garment to separate image channels to use them to create the intermediate model.

In some implementations of the method, where the images are rendered images, generating the intermediate model data is further based on at least one of:
- shininess information stored in an associated channel of one or more of the images;
- transparency information stored in an associated channel of one or more of the images;
- view dependent material properties stored in an associated channel of one or more of the images;
- geometry information from the CAD model of the garment, in particular vertices and/or normal of the CAD model;
- camera projection matrices used for rendering the images.

According to one embodiment of the improved modelling concept, a computer program product for producing three-dimensional model data of a garment having a target garment size comprises a non-transitory computer-readable storage medium and computer program instructions stored therein, enabling a computer system to execute a method according to one of the implementations described above.

Furthermore, a computer system may have a processor and a storage medium having computer program instructions stored therein, enabling the processor to execute a method according to one of the implementations described above.

The improved modelling concept will be explained in more detail in the following with the aid of the drawings. Elements and functional blocks having the same or similar function bear the same reference numerals throughout the drawings. Hence their description is not necessarily repeated in following drawings.

Figure 1:
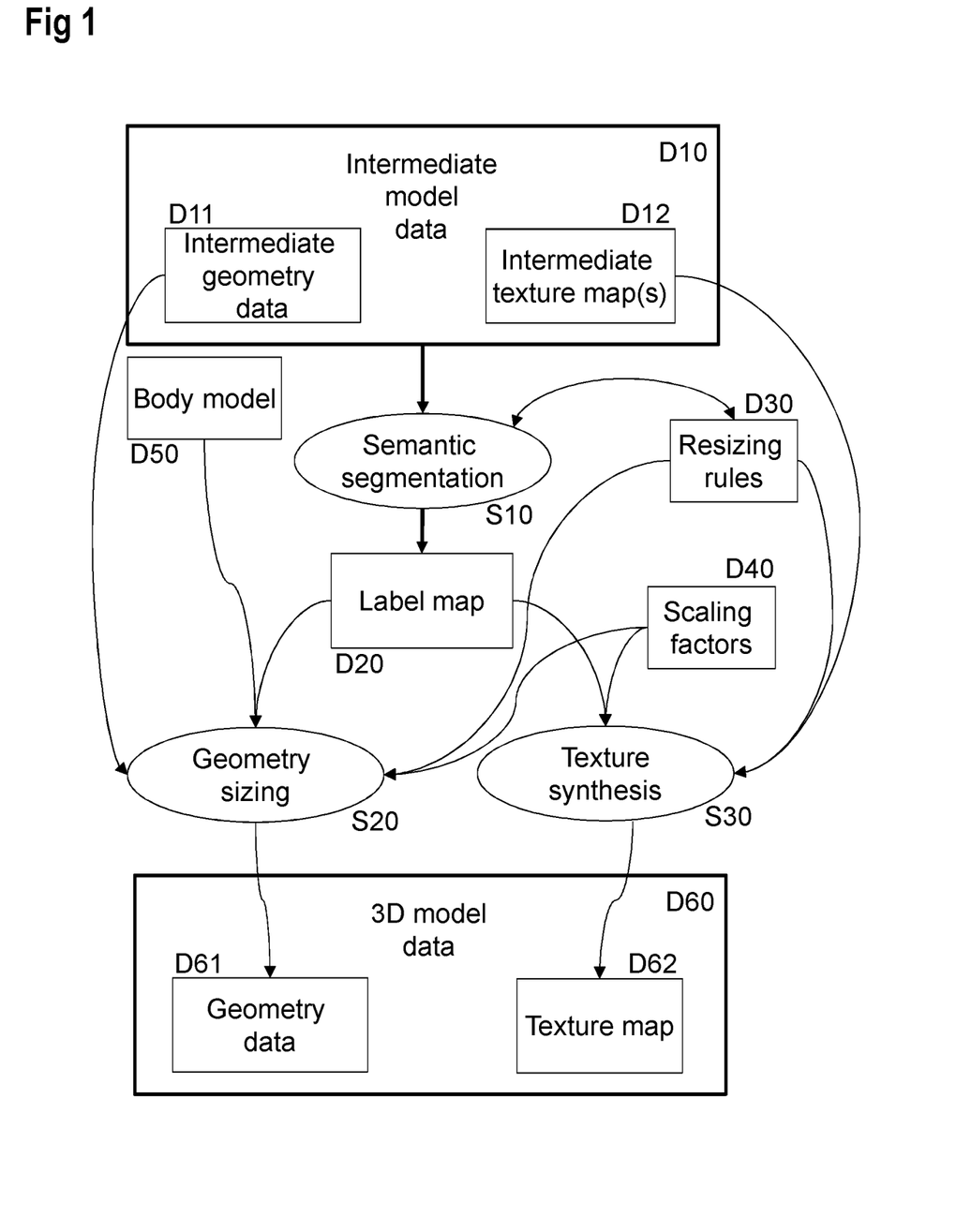
FIG. 1 shows an example block diagram of a method for producing three-dimensional model data of a garment.

FIG. 1 shows an example block diagram of a method for producing three-dimensional model data of a garment having a target garment size. The method is particularly carried out on a computer system that is able to store and process various kinds of information. In the following, reference numerals starting with D followed by a number refer to data structures stored in the computer system, reference numerals starting with S or G followed by a number refer to process steps carried out by the computer system.

For example, intermediate model data D10 are stored in the computer system, comprising intermediate geometry data D11 and one or more intermediate texture maps D12. Each intermediate texture map has a plurality of elements associated with the intermediate geometry data D11. The intermediate model data D10 represent a 3D model, wherein the intermediate geometry data D11 describe geometric information like vertices, faces or normals of the 3D model, for example by means of a list of 3D points or surface points, and wherein an intermediate texture map D12 corresponds to texture information of the 3D model, for example in the form of a two or more dimensional image. For example, each pixel in a texture map is called a "texel". For example, the pixels or texels are the elements of the texture map D12.

The association between the elements of the intermediate texture maps D12 and the intermediate geometry data D11 is, for example, implemented in that each vertex of the intermediate geometry data obtains an additional set of image coordinates for each texture map, which can be called "UV coordinates". Hence, the intermediate texture maps D12 are mapped to the geometry defined by the intermediate geometry data D11. The intermediate model data D10 are associated with a base garment size. Hence, the actual dimensions of the garment represented by the intermediate model data D10 are known.

In step S10, a semantic segmentation of the intermediate texture map D12 is performed for generating a label map D20. The label map D20 associates each element, e.g. texel, of the intermediate texture map D12 to a respective one of a set of segments of the garment, wherein each segment has an associated resizing rule comprised by resizing rules D30. In some implementations, the semantic segmentation S10 of the intermediate texture map D12 is performed further based on the intermediate geometry data D11, e.g. on the association of the elements of the intermediate texture map D12 with the intermediate geometry data D11. The label map D20 for example is an image that describes which pixels of the intermediate texture maps D12 are assigned to which semantic regions, or a likelihood of such an assignment.

In this step S10, the garment's intermediate geometry data D11 and its texture in the form of the intermediate texture maps D12, or only the intermediate texture maps D12, are input to a machine learning algorithm that assigns a semantic meaning to each element of the texture map, for example to each texel. For example, the semantic meaning defines to which part of a garment the respective element belongs, like a collar, a seam, a button, a sleeve, to name only a few. In this step S10, with the same or a similar algorithm, elements of the intermediate texture maps D12 relating to background and/or mannequin texels can be labelled for removal. Mannequin texels can appear, for example if a mannequin was used for generating the intermediate model data D10 and e.g. is visible through not fully opaque portions of the garment.

Hence, the label map D20 is created for the garment which assigns a behavioral rule to each texel through the segmentation. It is possible, but not essential, that a human operator can manually adjust the label map D20 to correct potential misclassifications or to adjust the rules.

Figure 2:
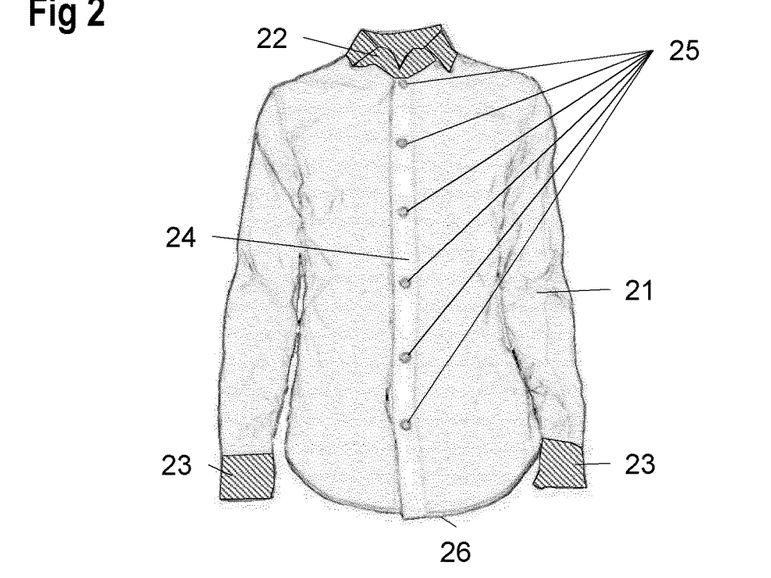
FIG. 2 shows an example garment with different segments.

Referring now to FIG. 2, an example of a segmentation of a piece of garment, here a shirt, is shown. For example, the intermediate texture map D12 of the model of the shirt is labelled for the segments for sleeves 21, collar 22, cuffs 23, a button strip 24, buttons 25 and a seam 26, to name only a few. Each segment identified or the respective elements of the identified segments are associated with one of the resizing rules D30, e.g. depending on the type of segment. For example, collar 22, cuffs 23 and buttons 25 do not scale for different sizes of the garment. The button strip 24 usually only scales vertically and seam 26 only scales horizontally. Further, more complex rules may also apply, e.g. for identified wrinkles that scale differently compared to flat portions of the garment for example. Furthermore, the rules may define whether a segment actually scales or can be resized by cutting or repeating respective portions of the garment, in particular with respect to textures. Some segments, for example, may only repeat in limited directions, hence with some constraints.

Further examples of the application of resizing rules D30 are given in conjunction with the description of the steps of geometry sizing S20 and texture synthesis S30 below.

In step S20 geometry sizing is performed in order to generate geometry data D61 of the target 3D model data D60 of the garment. This is done by resizing the intermediate geometry data D11 based on the label map D20, on the resizing rules D30 associated with the segments, on a body model D50 associated with the garment and on a set of a plurality of scaling factors D40 between the base garment size and the target garment size, for example two or more scaling factors. Therein, each of the scaling factors D40 is associated with a respective portion of the body model D50.

The 3D model data D60 have the same, or at least a similar, structure as the intermediate model data D10, i.e. the geometry data D61 represent a list of 3D points or surface points representing the 3D geometry of the garment, while texture map D62 represents the texture of the garment represented by two or more dimensional images with respective elements like texels that are associated to the respective 3D points of the geometry data D61.

Figure 3:
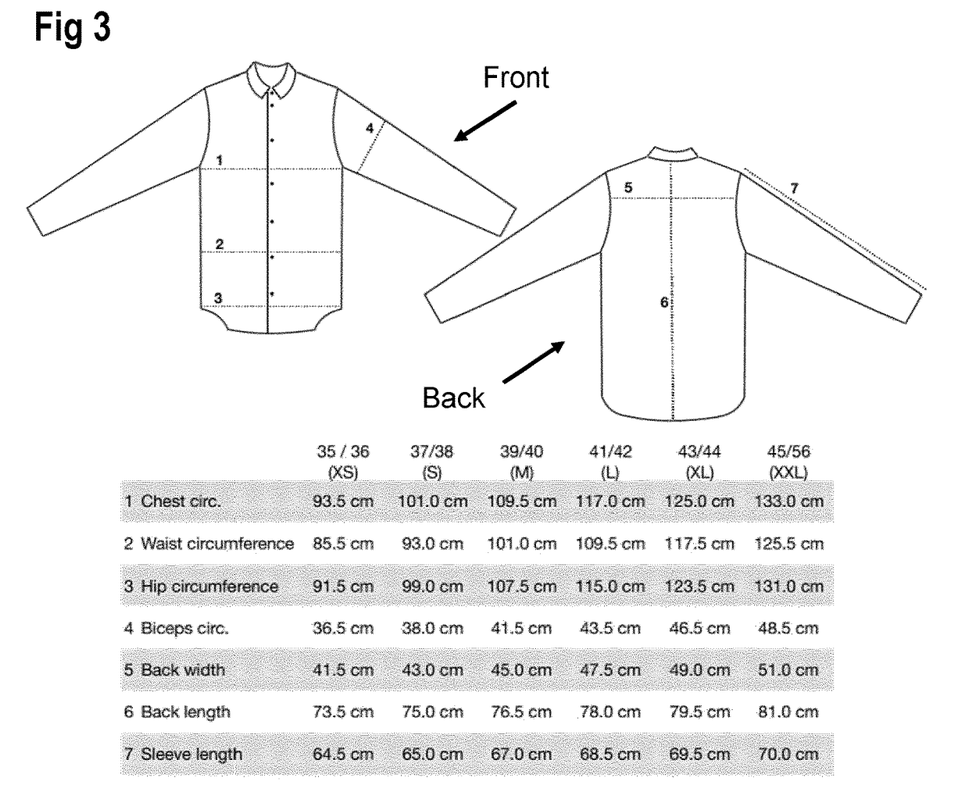
FIG. 3 shows an example grading table with an associated garment.

A basis for scaling the intermediate geometry data is the scaling factors D40 associated with the target garment size and representing, for example, at least a part of a grading table for the piece of garment. Referring now to FIG. 3, an example grading table for a shirt is shown. The table describes how different elements, like a chest circumference, a waist circumference, a hip circumference, a biceps circumference, a back width, a back length, a sleeve length etc. scale from one size of a garment to the next. For example, actual measurement values are given in each column of the grading table for different sizes. The scaling factors D40 therefore take into account a ratio between the base garment size of the intermediate model data and the target garment size of the target 3D model data.

For ease of explanation, FIG. 3 also includes a front view and a back view of an example shirt showing respective associations between the values in the respective rows and the actual garment.

Referring back to FIG. 1, semantic knowledge of the distinct regions or segments of a garment is available in order to apply the scaling information in the geometry sizing S20 step. For example, such semantic knowledge includes an association of the geometry of the garment to actual body parts. Such information, for example, can be extracted by assigning vertices of the garment's 3D surface as defined by the geometry data D11 to a rig of an underlying mannequin. Such a process can be called "skinning". Information about the rig of the underlying mannequin, i.e. the mannequin that wears the piece of garment, is for example defined in the body model D50. Hence, the body model provides information on where respective parts of the garment are worn on which part of the body. For example, this information also includes information about the position of bones or a skeleton within the body.

Figure 4:
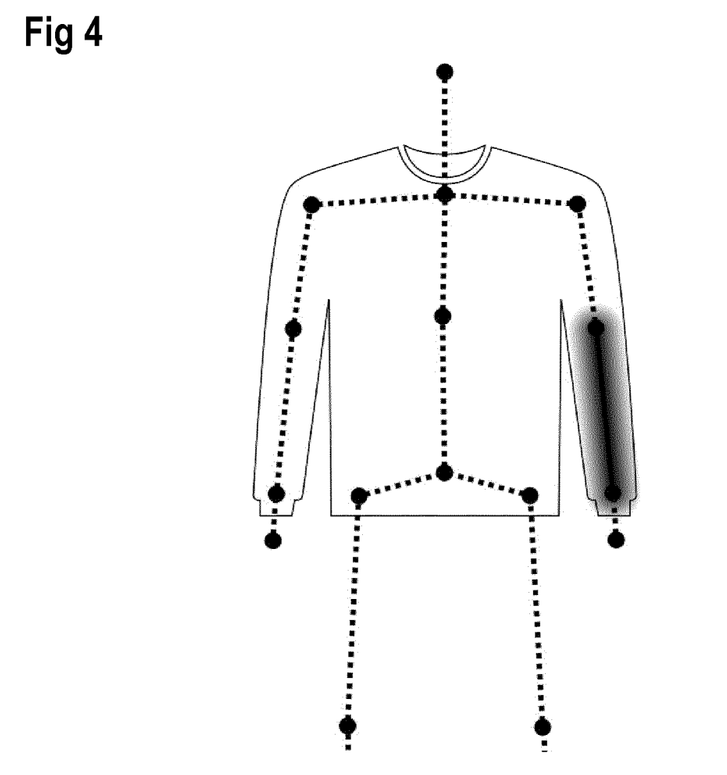
FIG. 4 shows an example of a piece of garment on a body model.

The so-called skinning process may assign vertices to a rig's bones with a specific weight, which is represented, for example, in the schematic drawing of FIG. 4. FIG. 4 shows a rig of a body model denoted by the connected bullets, and further a shirt as an example piece of garment worn on the rig. The specific weight assigned to the vertices of the geometry data are shown as an example on the right arm with different shadings. Referring back to FIG. 1, this assignment is used to scale or repeat the respective part of the geometry data when applying the information from the scaling factors D40 to the rig or skeleton as defined by the body model D50.

The body model D50 may be provided together with the intermediate model data D10. However, if such a body model D50 is not available in advance, the skeleton and rig information may also be computed automatically. For example, automated methods for computing the skeleton and rig of a model can be applied to human-shaped models. For example, the body model is generated by aligning and/or mapping a standard body model to the intermediate geometry data. For some types of garment, the humanoid shape cannot be recognized by the machine learning methods of the algorithm associating the geometry data to the rig, e.g. for skirts, tube tops or the like. For example, a combined garment and mannequin geometry data can be used as an input for achieving a robust algorithm generating the body model D50. In this way a humanoid shape is given and a relative location of the garment on the mannequin describes its overall fit.

The resizing rules D30 associated with the segments may also define how and in which sequence the scaling factors D40 are applied when performing the geometry sizing S20. For example, coarse to fine modifications are done. For example, for a shirt, first a desired shoulder width is established by scaling globally. Then the height is scaled to achieve the correct torso length, then the depth is scaled to achieve the correct waist circumference, then the arms are scaled using the rig.

The body model e.g. includes information defining an association between the respective portions of the body model and the respective portions of the intermediate geometry data. Generating the geometry data may comprise resizing of the intermediate geometry data by scaling or repeating the respective portions of the intermediate geometry data as defined by the body model based on the resizing rules.

In the texture synthesis step S30 a texture map D62 for the model data D60 of the garment is generated based on the intermediate texture map D12, on a label map D20, on the resizing rules D30 associated with the segments and on a set of scaling factors D40.

When simply adapting the size of the garment's geometry, the texture scales accordingly. This may be technically correct but usually does not reflect what is happening during the production of the first sizes of garment. Hence, according to the improved modelling concept, also the label map D20 and the resizing rules D30 are applied in step S30.

Figure 5:
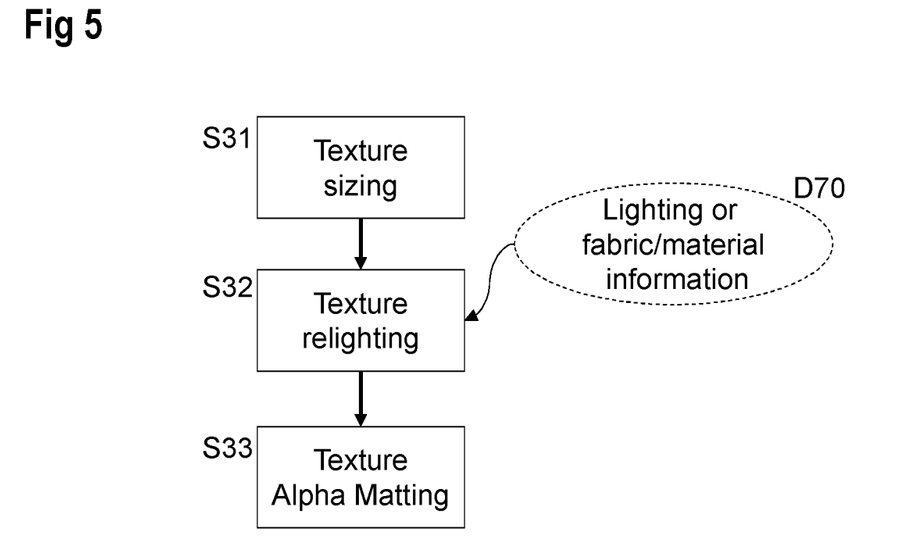
FIG. 5 shows an example block diagram for the process of texture synthesis.

Referring now to FIG. 5, the texture synthesis step S30 may include a texture sizing step S31 and optionally, a texture relighting step S32 and a texture alpha matting step S33.

Figure 6:
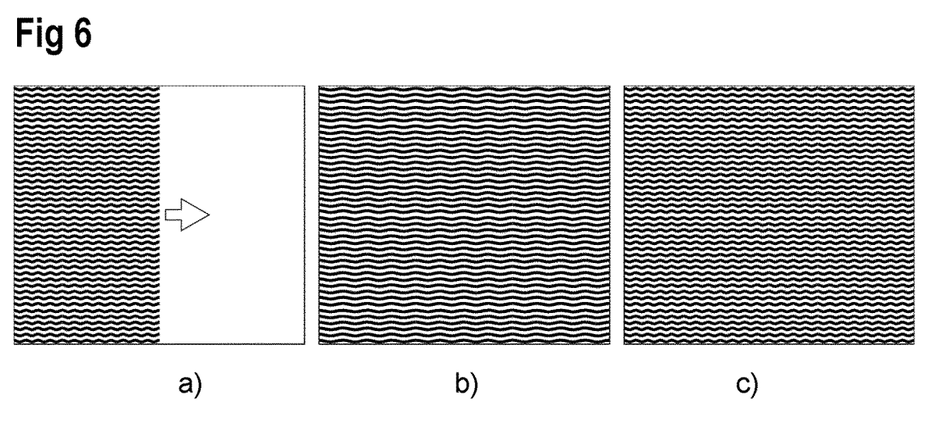
FIG. 6 shows resizing examples.

The input of the texture sizing step S31 is the one or more intermediate texture maps D12, the label map D20, the resizing rules D30 and the scaling factors D40 as defined above. Texture sizing may include resizing of the intermediate texture map by scaling or repeating or cutting pattern of the intermediate texture map based on the resizing rules. As discussed above, some parts of a garment do not scale completely or scale only partially. Furthermore, in reality fabrics usually are not stretched by scaling, but rather more of the fabric is used. Referring now to FIG. 6, this behavior is illustrated. The left image, labelled a) shows an example texture patch in a rectangle to be filled. In the middle image, labelled b), what happens if the texture patch is only scaled is shown, namely a different and wrong impression of the wave pattern of image a). Hence, instead the texture pattern needs to be repeated as shown in the right image labelled c). Technically, this corresponds to repeating the material. For homogenous fabrics, scaling is technically sufficient, since the difference may not be visually noticeable. The way the texture is sized, hence, is inter alia defined in the resizing rules D30.

As discussed above, this differentiation is mostly important for the texture of the garment, but it can also be important for the geometry when it comes to fine details. For example, wrinkles would look unnatural when they are stretched. Also in such cases the correct handling may require repeating the geometry and thereby continuing the geometric pattern. For example, to be able to reproduce the repeat behavior, information about the texture of the used fabrics may be provided to the system in the form of images. When resizing the texture, the respective images of the fabric are registered to the texture and the added areas can be extrapolated. The same or similar logic applies to elements that repeat in only one direction and are fixed in the other. A repeat behavior for texture sizing can be achieved through several methods, for example including texture synthesis, inpainting and tiling algorithms as well as through separately photographed fabric patches, which are preferably provided together with the intermediate model data D10.

If the one or more intermediate texture maps include imprints, a separation of the underlying fabric and the imprint may need to be performed. This can be done by using the provided images of the fabric to inpaint and extract, and thereby remove the region that contains the decorative elements. Thereby, the fabric and the imprint can be treated independently.

Referring back to FIG. 5, in step S32 a texture relighting may be applied. For example, to achieve texture resizing without incorrectly handling lighting and/or shading effects caused by e.g. wrinkles, concavities, convexities in the geometry etc., the texture's color information may be separated from the lighting information to be reapplied to the final result. For example, the color information can also be called "albedo" representing the material's base color. Hence, generating the texture map may comprise separating lighting information of the intermediate texture map from color information of the intermediate texture map for producing a lighting map and a color map, resizing of the color map, and applying the lighting map to the resized color map for producing the texture map.

Another reason for separating color information, respectively material information, and lighting information is that the same type of garment may often be produced in different colors or from different fabrics. Hence, at this step it is also possible to alter the color map before applying the resizing step and applying the lighting map to the resized color map. This may avoid having to scan all variations of the same type of garment in different colors or materials. There are two general approaches to separate color from lighting information: either the lighting is known or the fabric, respectively material, is known. This information may be provided as lighting or fabric/material information D70 in the texture relighting step S32.

In the first case, the light conditions during production of the intermediate model data D10 are known, which are for example digitized in the form of environment maps or lighting models. In the second case, the separating may be based on images of fabric patches/material patches associated with the intermediate model data D10. For example, these patches are captured under white, diffuse and homogenous lighting conditions. By computing a difference between the texture that includes the shading information and the uniformly lit fabric sample, the shading can be separated from the color.

In the case of non-diffuse materials, the material properties and environment map may need to be reconstructed during production of the intermediate model data D10, which will be explained in more detail later.

Figure 7:
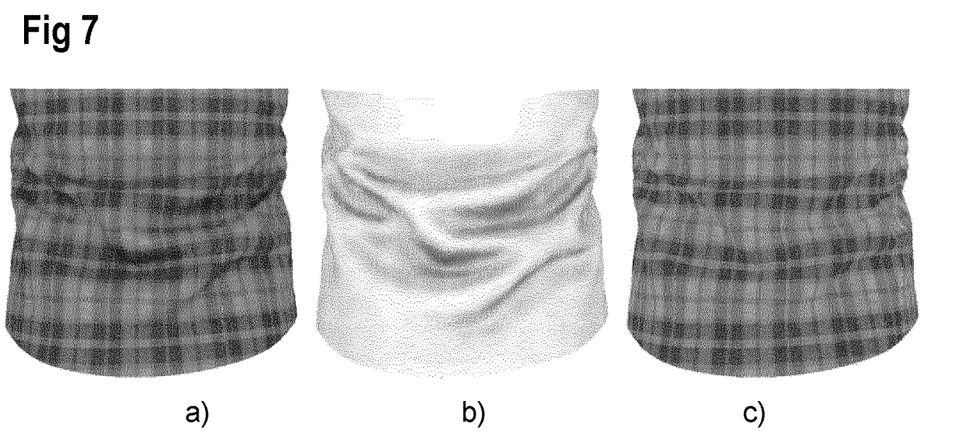
FIG. 7 shows an example of separation of color information and lighting information.

Referring now to FIG. 7, the left image labelled a) shows a representation of the fabric as seen in the intermediate texture map. In the middle image labelled b) an image showing the lighting information is depicted, while on the right image labelled c) only the color information of the fabric is shown.

When replacing a material, the provided fabric samples are preferably captured in the same scale and orientation as the original samples. If this is the case, the computed registration of the actual fabric can be used to replace the texture with a different material. Finally, the previously separated shading/lighting information is reapplied to the new texture.

Referring back to FIG. 5, in step S33 a texture alpha matting can be applied. If a garment has transparent parts or complex outlines like fringes, laces etc., alpha matting may be needed to realistically reproduce the garment's texture. Alpha matting is the process of assigning opacity values to each texel of the texture map that describes a proportion of foreground color in each texel's color. For example, it is helpful if garments are captured or rendered on top of a contrasting mannequin or person and background during production of the intermediate model data D10. For example, in a texture map, one color can be assigned to a high opacity while another color is assigned to a low opacity. Fractional values or combinations of colors are possible to describe several levels of opacity.

Figure 8:
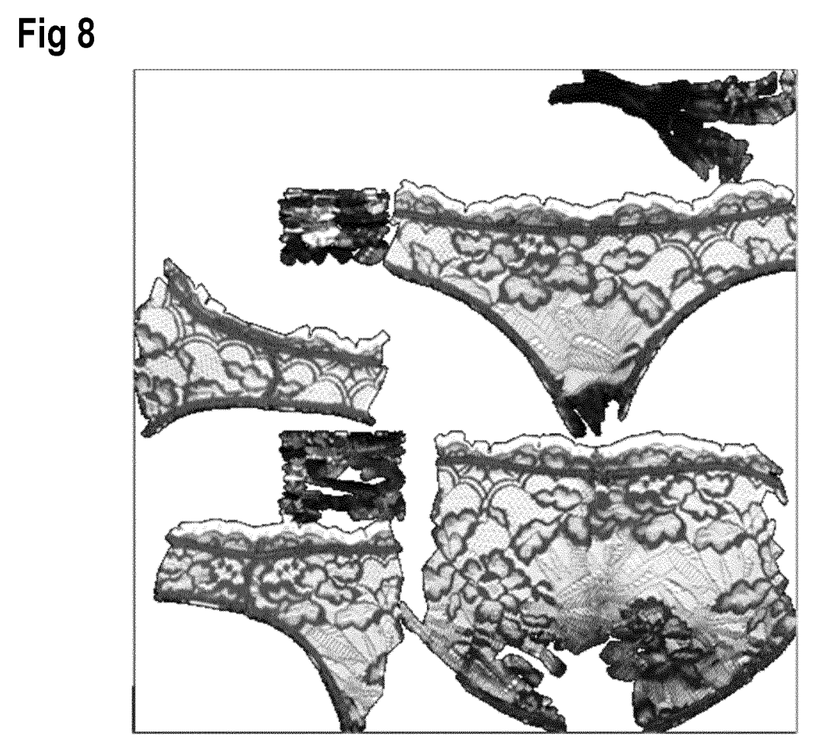
FIG. 8 shows an example texture map.

For example, a matting algorithm underlying step S33 may work as follows: First, the mannequin and background colors are derived from the according texture segments, for example during the semantic segmentation step S10, e.g. by building a histogram. Next, each of the garment's elements or texels is compared to the background histograms to determine its transparency. Finally, the transparency values used to subtract the background color from the garment's texels or element's foreground color results in a transparency map which may have the appearance as shown in FIG. 8. It should be noted that the transparency map for example has the same structure and dimension as the intermediate and/or final texture map and is associated with the geometry data in the same manner, for example via respective UV coordinates.

Figure 9:
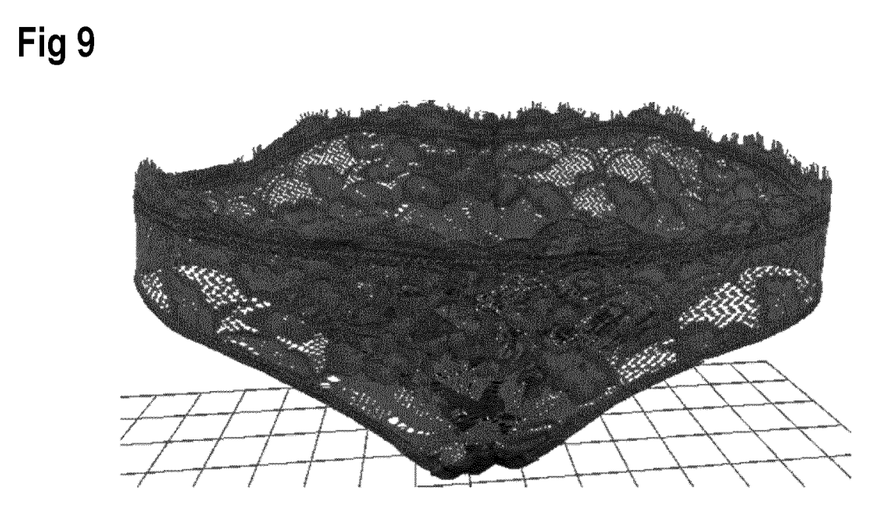
FIG. 9 shows an example of application of three-dimensional model data of a garment.

The resulting geometry data D61, the texture map D62 and optionally the transparency map can be used to realistically render even complex garments. For example, FIG. 9 shows an example rendering of a pantyhose with transparent elements, which, for example, take the transparency of FIG. 8 as a basis. Further applications of applying the final three-dimensional model data D60 will be explained in more detail later in conjunction with FIG. 12.

In other words, the method according to the improved modelling concept may further comprise generating a transparency map based on the intermediate texture map and, optionally, the label map and includes determining, for each element of the intermediate texture map, a background color based on the intermediate texture map, comparing each element of the intermediate texture map to the respective background color of the element for determining a transparency value of the element, and for each element of the intermediate texture map, subtracting, based on the respective transparency value of the element, the background color of the element from a respective foreground color of the element.

In the foregoing description of the drawings, it has more or less been assumed that the intermediate model data D10 were already provided in a suitable format for being processed to achieve the final 3D model data D60. However, in the following, some example implementations of how the intermediate model data D10 are generated will be presented.

Figure 10:
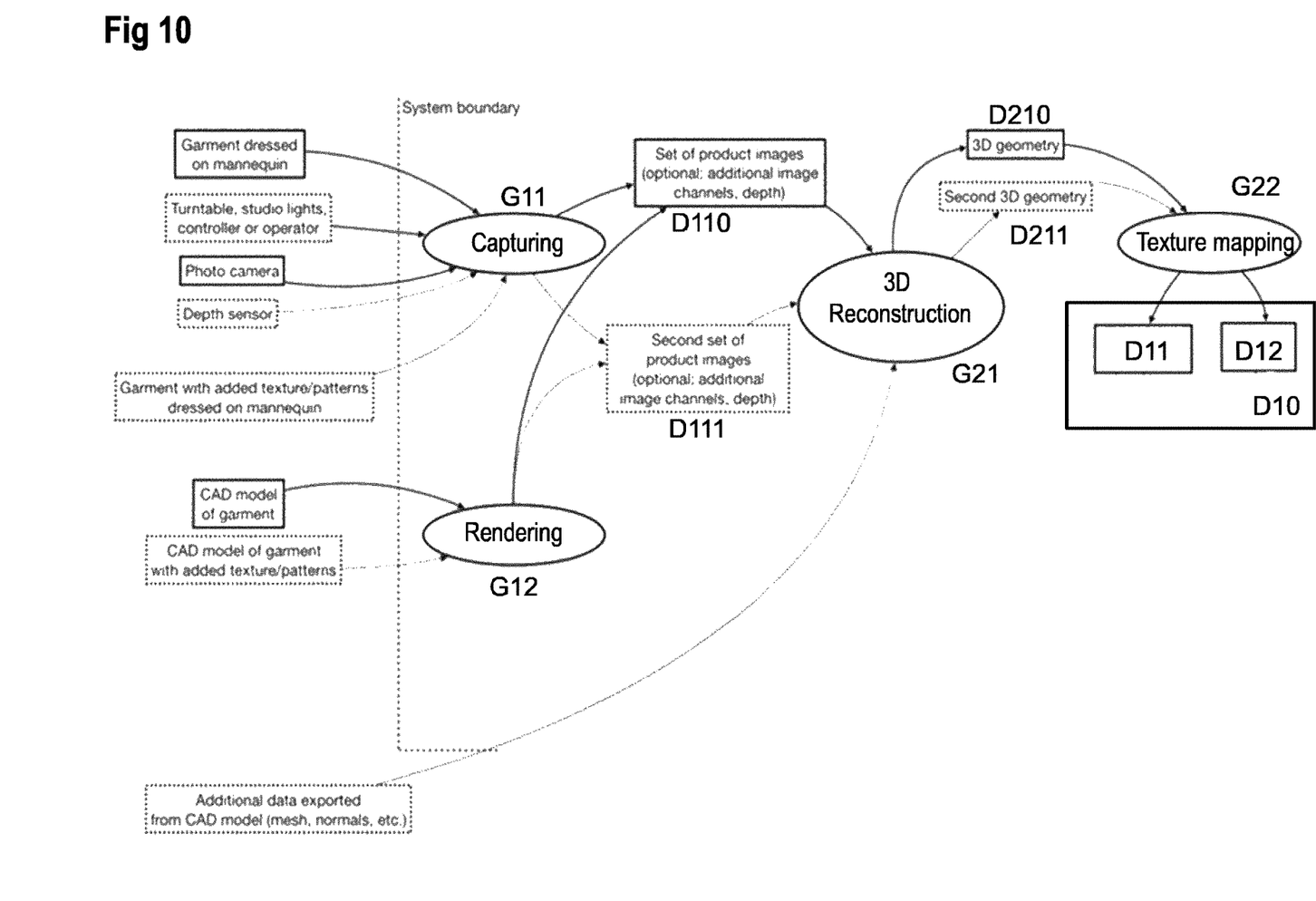
FIG. 10 shows an example block diagram for a process of generating intermediate model data.

Hence, referring now to FIG. 10, the method according to the improved modelling concept further comprises generating and storing the intermediate model data D10 based on a set of images showing the garment from a plurality of viewing angles. Thereby, generating the intermediate model data D10 includes a step of 3D reconstruction G21 for generating the intermediate geometry data D11 and a step of texture mapping G22 for generating the intermediate texture map D12. Both steps, for example, work on the set of images. For example, the images are photographs of the garment being dressed on a mannequin or on a person, as for example captured in a capturing step G11. In an alternative implementation, the images are rendered images of a CAD model of the garment in a worn state, as for example provided in a rendering step G12.

Hence, both with the capturing step G11 or the alternative rendering step G12, a set of product images D110 is produced that show the garment, so to say, from all sides. In both cases the product, respectively the garment, is turned in front of a real or virtual camera, or vice versa, and moved to different elevations to capture as many viewing angles as possible.

Figure 11:
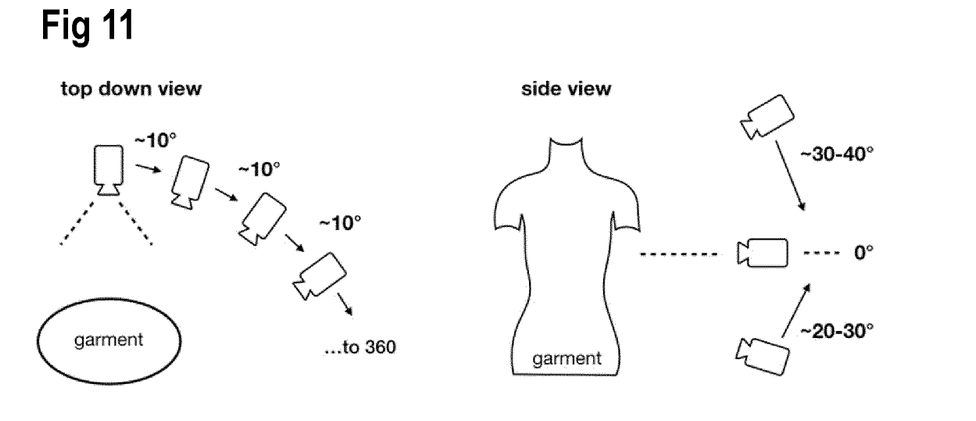
FIG. 11 shows example camera configurations.

FIG. 11 shows example implementations of such a process with a top-down view of the garment on the left side and a side view of the garment on the right side of FIG. 11. The example differential angle of about 10° in the top-down view is only used as an example and could also be higher or lower depending on the complexity of the garment. Similarly, also the viewing angles denoted on the right side for the side view of the garment are only taken as examples. Referring back to FIG. 10, for example the capturing step G11 can be implemented with a turntable, on which the garment dressed on a mannequin is placed for achieving the different viewing angles. Alternatively, the camera can be moved around the garment dressed on the mannequin.

Referring back to FIG. 10, in particular step G11, in the following some recommendations are given for capturing the garment by photography:

With respect to a recommended pose, the garment should be dressed on a mannequin, wherein the size of the garment should match the size of the mannequin, or vice versa, to avoid deformations. The mannequin should preferably be in the A-pose where the arms of the mannequin form an A-shape. Such a pose usually has very little self-occlusion and also does not distort the garment significantly, like for example a T-pose. The used mannequins can also be captured without closing once. A skeleton, respectively rig, can be fitted to the mannequin, which can be used to modify the geometry of the garments, e.g. in the geometry sizing step S20 described above in conjunction with FIG. 1. For example, the image of the mannequin itself and the rig can be used for providing the body model D50.

The 3D reconstruction G21 usually operates by image feature matching and needs to be able to correctly identify and distinguish images features in several images as well as possible. To support this, the captured images should have little or no compression, for example with a resolution of at least 6 megapixels.

In order to improve the identification of transparency properties in the garment, i.e. to capture transparent or translucent clothes, the color of the mannequin and the background preferably have a high contrast to the garment.

With respect to lighting, strong directional light sources often produce drop shadows and reflections, which are undesirable for 3D reconstruction G21. Hence, a bright, diffuse light setting is preferred.

Photo capturing can be achieved by a human operator or can be automated by a machine consisting of an electric turntable, one or more cameras, flashes and a control unit, e.g. a computer.

Capturing may be performed with a standard DSLR camera or smartphone camera. An option to deal with some of the shortcomings of photogrammetry as employed in steps G21, G22 for example, active or passive depth sensors, e.g. structured light or time-of-flight sensors, LIDAR etc. can be used. High quality images from a camera are always needed, even when depth sensors are added to the system.

When rendering a CAD model of the garment in the rendering step G12 as an alternative, this may be done similar to photo capturing: the garment should be visible from all sides and at different elevations. The rendered images should obey the following optional but recommended specifications: With respect to pose, the same pose and occlusion principles as described above for photo capturing apply, in particular long-sleeved garments should rendered in an A-pose on a virtual mannequin.

With respect to resolution of the rendered images, the 3D reconstruction algorithm of step G21 operates by image feature matching and needs to be able to correctly identify and distinguish image features in several images. To enable this, the rendered images are preferably in a lossless image format like PNG, with a resolution that is a) high enough to reflect to all geometric and texture details that are present in the CAD model and b) high enough to avoid visible pixel borders and aliasing. At the same time, the resolution should not be higher to avoid unnecessary computational complexity in the steps of 3D reconstruction G21 and texture mapping G22, and afterwards during resizing.

With respect to transparency, 3D reconstruction usually assumes opaque, i.e. non-transparent, surfaces to enable reliable image feature matching. Garments, however, are often partly or fully transparent. This means that some or all garment pixels in a rendered image consist of a mix of colors of the underlying layers of the garment, its back side and mannequin parts or background. This may lead to undetected or wrongly detected image features. In order to avoid this situation, the improved modelling concept prefers to render only the front-most depth layer of the model and store the pixels' transparencies in a separate channel, i.e. the alpha channel of the image, for example PNG image. In this way, the RGB colors of each pixel are not contaminated with underlying pixel colors and the transparency can later be used for realistic rendering.

3D reconstruction usually assumes diffuse, i.e. non-reflecting, surfaces. Strongly reflecting surfaces look different from different viewing angles, which complicates the image feature matching process. Therefore, a bright, diffuse light setting is used, together with materials with no shininess. To preserve shiny or otherwise view-dependent materials during 3D reconstruction and texture mapping and during the whole resizing process described in FIG. 1, and enable a final rendering with these effects, each pixel's shininess coefficients and optionally other view-dependent material properties are stored to a separate image channel during CAD model rendering. These channels may be transformed in process steps G21, G22, S10, S20 and S30 similar to the RGB channels and enable the shaders, described in conjunction with step S40 in FIG. 12 in more detail later, to reproduce the original material properties.

As described with the image capturing step G11 above, strong directional light sources produce drop shadows and reflections, which are undesirable. Hence, also during rendering, G12, a bright, diffuse light setting along with ambient lighting/shading or ambient occlusion is used for realism.

Further information can be generated during the rendering process or at least in conjunction with the rendering process which can be used in a 3D reconstruction G21. For example, such information includes one or more of the following:

shininess information stored in an associated channel of one or more of the images;
transparency information stored in an associated channel of one or more of the images;
view dependent material properties stored in an associated channel of one or more of the images;
geometry information from the CAD model of the garment, in particular vertices and/or normal of the CAD model;
camera projection matrices used for rendering the images.

For example, the CAD model's vertices and normals can be used as a base shape during structure-from-motion processes and the 3D reconstruction step G21, and the exported camera projection matrices can be used to reduce the complexity of the underlying problem. Such modifications ensure a robust and high quality reconstruction result even for difficult garments like garments with shiny surfaces and low texture details.

The rendering process can be driven by a human operator or can be fully automated by e.g. a script or program that creates the described renderings according to a given specification.

3D reconstruction as performed in step G21 usually assumes textured, not smooth surfaces to identify image features across several images. Hence, single colored, smooth and large surfaces degrade the reconstruction result. To this end, generating the intermediate model data D10 may be further based on a further set of images D111 showing the garment from a plurality of viewing angles. The images of the further set of images D111 show the garment with added visually distinctive features, for example virtual or real patterns and/or stickers and/or tapes at a surface of the garment.

In the case of captured images as described in conjunction with step G11, a regular image set D110 is captured as described above. Furthermore, all smooth surfaces of the garment dressed on the mannequin are modified by adding stickers, tapes, structured light patterns or other visually distinctive features. The modified garment is captured in the same manner as the unmodified garment before. This results in two separate image sets D110, D111 that are both input to a separate 3D reconstruction step comprised by step G21.

For example, generating the intermediate model data comprises generating auxiliary geometry data by performing 3D reconstruction based on the further set of images D110, and, aligning the intermediate texture map to the auxiliary geometry data by aligning the intermediate geometry data to the auxiliary geometry data. For example, both resulting 3D models are aligned, e.g. through an iterative closest point algorithm. Finally, the good 3D mesh from the modified image set is texture mapped with the original image set, which was brought into the same coordinate system, e.g. through mesh alignment. As a result, the best of both image sets is achieved, namely good geometry from the modified set and the original garment appearance from the unmodified set.

In the case of rendered images from a CAD model, a high frequency pattern, e.g. a random dot or noise pattern, may be added to all smooth materials of the CAD model. The images rendered from the modified CAD model, e.g. from the same camera positions as the unmodified CAD model form the further set of images D111 as described above. Similar as for the captured images, 3D reconstruction can be performed on both image sets D110, D111 to achieve the intermediate model data D10.

The steps of 3D reconstruction G21 and texture mapping G22 are preferably fully automated. The input is one or more set of images and optional metadata as described above in conjunction with the capturing G11 and rendering G12 processes. The output is a 3D model, consisting of geometric information like vertices, faces, normals etc., e.g. in the form of 3D surface points, and texture information as described above.

3D reconstruction G21 can be based on conventional photogrammetry methods like (simultaneous) localization and mapping, SLAM, structure-from-motion, SFM or the like. These approaches find and identify common parts in the image set/sets by matching so-called image features. Image features are distinctive points or patches in an image, for example a specific color gradient or pattern. By matching these features and triangulating corresponding 3D points, a 3D surface hypothesis is reconstructed. It is possible to use optimization methods that enforce a certain smoothness of the surface to improve the result To make this process more reliable, several modifications are possible, e.g. the provision of a second set of images with added visually distinctive features, as described above. Another option to deal with some of the shortcomings of conventional photogrammetry is passive or active depth sensors, e.g. structured light or time-of-flight sensors, LIDAR, etc. In this case, the 3D reconstruction step G21 may be based on e.g. a depth map fusion algorithm instead of photogrammetry.

A texture map is a two or more dimensional image, wherein each pixel in a texture map is called a texel, for example. Each model vertex defined in the 3D geometry D210 or the second 3D geometry D211 obtains an additional set of image coordinates, often called UV coordinates, for each texture map.

After 3D reconstruction G21, the input images are used to generate one or more texture map for the model in the texture mapping step G22. For example, this happens through projective texture mapping, visibility checks, texture map alignment and/or fusion methods that reduce undesired view-dependent effects and compensate for deficiencies of the reconstructed geometry. With respect to the second set of images described above, carrying added visually distinctive features, the images used for texture map generation can be different from the image set or depth map set used for the 3D reconstruction.

Figure 12:
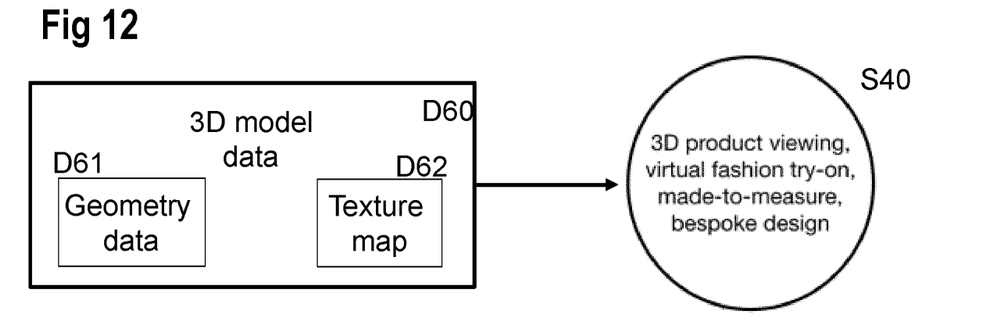
FIG. 12 shows an example block diagram of application of 3D model data of a garment.

Referring now to FIG. 12, possible applications of the result of the improved modelling concept are described. As explained in more detail above, the processes of the improved modelling concept finally provide 3D model data D60 of a garment of a target garment size, which include the geometry data D61 and the texture map D62. In a following application step S40, the resulting garment models can be used e.g. for 3D product viewing. For example, the 3D model data can be displayed in a 3D model viewer on websites, in apps, etc. to enable potential e-commerce customers to make better buying decisions.

In another application, the 3D model data can be used for virtual try-on of garments and mix and match applications. For example, the resulting garment model in the different sizes can be rigged to any new desirable body pose and fitted to a user's body through e.g. differential mesh editing. Such a fitted mesh enables ecommerce customers to better judge the fit and size of a garment and choose the proper convention size. Moreover, users can combine multiple garments together.

Another application of the 3D model data D60 relates to creation of arbitrary sizes. The described process creates a set of discrete confection sizes of a garment, for example. In addition, the system learns the scaling behavior of the garment as a part of the process as described above. Therefore it can be used to create an arbitrary number of in-between sizes. This enables novel made-to-measure and bespoke garment use cases by calculating and manufacturing the perfect size for each customer individually.

Figure 13:
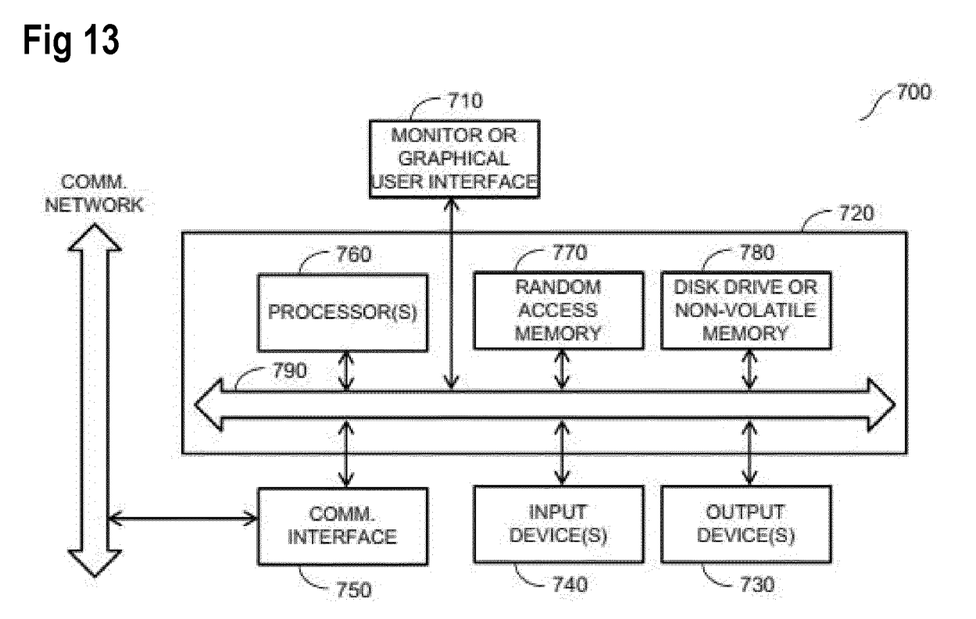
FIG. 13 shows an example system for producing output images according to the improved modelling concept.

FIG. 13 is a block diagram of a computer system that may incorporate embodiments according to the improved concept. FIG. 13 is merely illustrative of an embodiment incorporating the improved concept and does not limit the scope of the invention as recited in the claims. One of ordinary skill in the art would recognize other variations, modifications, and alternatives.

In one embodiment, computer system 700 typically includes a monitor 710, a computer 720, user output devices 730, user input devices 999, communications interface 750, and the like.

As shown in FIG. 13, computer 720 may include a processor(s) 760 that communicates with a number of peripheral devices via a bus subsystem 790. These peripheral devices may include user output devices 730, user input devices 740, communications interface 750, and a storage subsystem, such as random access memory (RAM) 770 and disk drive 780.

User input devices 740 include all possible types of devices and mechanisms for inputting information to computer system 720. These may include a keyboard, a keypad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, drawing tablet, voice command system, eye tracking system, and the like. User input devices 740 typically allow a user to select objects, icons, text and the like that appear on the monitor 710 via a command such as a click of a button or the like. User input devices 740 may also include color and/or depth cameras, body shape and/or pose tracking sensors, hand tracking devices, head tracking devices or the like. User input devices 740 may particularly include various types of cameras, e.g. a DSLR camera or a camera of a smartphone or the like. Such camera or smartphone or other mobile device may be connected to computer 720 over a communication network connected via communications interfaces 750.

User output devices 730 include all possible types of devices and mechanisms for outputting information from computer 720. These may include a display (e.g., monitor 710), non-visual displays such as audio output devices, etc.

Communications interface 750 provides an interface to other communication networks and devices. Communications interface 750 may serve as an interface for receiving data from and transmitting data to other systems. Embodiments of communications interface 750 typically include an Ethernet card, a modem (telephone, satellite, cable, ISDN), (asynchronous) digital subscriber line (DSL) unit, FireWire interface, USB interface, wireless connections like Wi-Fi and Bluetooth, and the like. For example, communications interface 750 may be coupled to a computer network, to a FireWire bus, or the like. In other embodiments, communications interfaces 750 may be physically integrated on the motherboard of computer 720, and may be a software program, such as soft DSL, or the like.

In various embodiments, computer system 700 may also include software that enables communications over a network such as the HTTP, TCP/IP, RTP/RTSP protocols, and the like.

RAM 770 and disk drive 780 are examples of tangible media configured to store data, including executable computer code, human readable code, or the like. Other types of tangible media include solid state drives, SSD, floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 770 and disk drive 780 may be configured to store the basic programming and data constructs that provide the functionality of the improved modelling concept.

Software code modules and instructions that provide the functionality of the improved modelling concept may be stored in RAM 770 and disk drive 780. These software modules may be executed by processor(s) 760. RAM 770 and disk drive 780 may also provide a repository for storing data used in accordance with the present invention.

RAM 770 and disk drive 780 may include a number of memories including a main random access memory (RAM) for storage of instructions and data during program execution and a read only memory (ROM) in which fixed instructions are stored. RAM 770 and disk drive 780 may include a file storage subsystem providing persistent (non-volatile) storage for program and data files. RAM 770 and disk drive 780 may also include removable storage systems, such as removable flash memory.

Bus subsystem 790 provides a mechanism for letting the various components and subsystems of computer 720 communicate with each other as intended. Although bus subsystem 790 is shown schematically as a single bus, alternative embodiments of the bus subsystem may utilize multiple busses.

FIG. 13 is representative of a computer system capable of embodying the improved modelling concept. It will be readily apparent to one of ordinary skill in the art that many other hardware and software configurations are suitable for such use. For example, the computer may be a mobile device, in particular a mobile phone, or desktop, portable, rack-mounted or tablet configuration. Additionally, the computer may be a series of networked computers.

Various embodiments of the improved concept can be implemented in the form of logic in software or hardware or a combination of both. The logic may be stored in a computer readable or machine-readable storage medium as a set of instructions adapted to direct a processor of a computer system to perform a set of steps disclosed in embodiments of the improved concept. The logic may form part of a computer program product adapted to direct an information-processing device to automatically perform a set of steps disclosed in embodiments of the improved modelling concept.

The specification and drawings are, accordingly, to be regarded in an illustrative rather than a restrictive sense. However, it will be evident that various modifications and changes may be made thereunto without departing from the scope of the invention as set forth in the claims.

The invention claimed is:

1. A computer implemented method for producing 3-dimensional model data of a garment having a target garment size, the method comprising
storing, in a computer system, intermediate model data of the garment, the intermediate model data being associated with a base garment size and comprising intermediate geometry data and at least one intermediate texture map having a plurality of elements associated with the intermediate geometry data;
performing, in the computer system, a semantic segmentation of the intermediate texture map for generating a label map, the label map associating each element of the intermediate texture map to a respective one of a set of segments of the garment, and each segment having an associated resizing rule;
generating, in the computer system, geometry data for the 3-dimensional model data of the garment by resizing the intermediate geometry data based on the label map, on the resizing rules associated with the segments, on a body model associated with the garment and on two or more scaling factors, each of the scaling factors being associated with a respective portion of the body model; and
generating, in the computer system, a texture map for the model data of the garment based on the intermediate texture map, on the label map, on the resizing rules associated with the segments and on the scaling factors generating and storing the intermediate model data based on a set of images showing the garment from a plurality of viewing angles, wherein generating the intermediate model data includes 3D reconstruction for generating the intermediate geometry data and texture mapping for generating the intermediate texture map, and the set of images are one of:

photographs of the garment being dressed on a mannequin or on a person;

rendered images of a CAD model of the garment in a worn state, wherein generating the intermediate model data is further based on a further set of images showing the garment from a plurality of viewing angles, the images of the further set of images showing the garment with added visually distinctive features, in particular virtual or real patterns and/or stickers and/or tapes, at a surface of the garment, and wherein generating the intermediate model data comprises generating auxiliary geometry data by performing 3D reconstruction based on the further set of images; and aligning the intermediate texture map to the auxiliary geometry data by aligning the intermediate geometry data to the auxiliary geometry data.

2. The method according to claim 1, wherein the semantic segmentation of the intermediate texture map is performed further based on the association of the plurality of elements of the intermediate texture map with the intermediate geometry data.

3. The method according to claim 1, wherein the body model further includes information defining an association between the respective portions of the body model and respective portions of the intermediate geometry data.

4. The method according to claim 3, wherein generating the geometry data comprises resizing of the intermediate geometry data by scaling or repeating the respective portions of the intermediate geometry data as defined by the body model based on the resizing rules.

5. The method according to claim 1, wherein generating the texture map comprises resizing of the intermediate texture map by scaling or repeating or cutting pattern of the intermediate texture map based on the resizing rules.

6. The method according to claim 1, further comprising generating a transparency map based on the intermediate texture map, wherein generating the transparency map includes determining, for each element of the intermediate texture map, a background color based on the intermediate texture map;

comparing each element of the intermediate texture map to the respective background color of the element for determining a transparency value of the element; and for each element of the intermediate texture map, subtracting, based on the respective transparency value of the element, the background color of the element from a respective foreground color of the element.

7. The method according to claim 1, wherein the body model is stored with and corresponding to the intermediate model data.

8. The method according to claim 1, wherein the images are photographs and generating the intermediate model data is further based on depth information of a surface of the garment, in particular recorded with one or more active or passive depth sensors.

9. The method according to claim 1, wherein the images are rendered images and wherein, for facilitating the 3D reconstruction, rendering the rendered images includes at least one of:

rendering only a front-most depth layer of the CAD model;

modifying materials of the garment partially or completely to be opaque;

rendering without considering any transparencies of the garment;

rendering with neglecting transparencies of the garment partially or completely;

using virtual lighting that is diffuse, uniform and bright;

replacing anisotropic and shiny materials with diffuse materials of the garment;

rendering material properties of the garment to separate image channels to use them to create the intermediate model data.

10. The method according to claim 1, wherein the images are rendered images and generating the intermediate model data is further based on at least one of:

shininess information stored in an associated channel of one or more of the images;

transparency information stored in an associated channel of one or more of the images;

view dependent material properties stored in an associated channel of one or more of the images;

geometry information from the CAD model of the garment, in particular vertices and/or normal of the CAD model;

camera projection matrices used for rendering the images.

11. The method according to claim 1, wherein the body model is generated by aligning and/or mapping a standard body model to the intermediate geometry data.

12. A computer implemented method for producing 3-dimensional model data of a garment having a target garment size, the method comprising:

storing, in a computer system, intermediate model data of the garment, the intermediate model data being associated with a base garment size and comprising intermediate geometry data and at least one intermediate texture map having a plurality of elements associated with the intermediate geometry data;

performing, in the computer system, a semantic segmentation of the intermediate texture map for generating a label map, the label map associating each element of the intermediate texture map to a respective one of a set of segments of the garment, and each segment having an associated resizing rule;

generating, in the computer system, geometry data for the 3-dimensional model data of the garment by resizing the intermediate geometry data based on the label map, on the resizing rules associated with the segments, on a body model associated with the garment and on two or more scaling factors, each of the scaling factors being associated with a respective portion of the body model; and generating, in the computer system, a texture map for the model data of the garment based on the intermediate texture map, on the label map, on the resizing rules associated with the segments and on the scaling factors, wherein generating the texture map comprises separating lighting information of the intermediate texture map from color information of the intermediate texture map for producing a lighting map and a color map;

resizing of the color map; and applying the lighting map to the resized color map for producing the texture map.

13. The method according to claim 12, wherein the separating is based on images of fabric patches or material patches associated with the intermediate model data.

14. A computer program product for producing 3-dimensional model data of a garment having a target garment size, the computer program product comprising a non-transitory computer readable storage medium and computer program instructions stored therein enabling a computer system to execute a method according to claim 1.

* * * * *